United States Patent Office 3,147,260
Patented Sept. 1, 1964

3,147,260
PIPERAZINYLALKYL BENZOTRIAZOLE
DERIVATIVES
Anthony Stanley Fenton Ash, Epping, Andrew Malcolm Creighton, Mill Hill, London, and William Robert Wragg, Woodford Green, England, assignors to May & Baker Limited, Dagenham, England, a British company
No Drawing. Filed Feb. 15, 1961, Ser. No. 89,356
Claims priority, application Great Britain Feb. 19, 1960
6 Claims. (Cl. 260—268)

This invention relates to benzotriazole derivatives of therapeutic value, a process for their preparation and pharamaceutical compositions containing them.

According to the present invention, there are provided new therapeutically useful benzotriazole derivatives of the general formula:

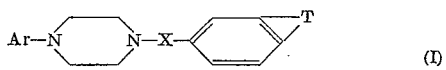
(I)

wherein X represents a straight, saturated or ethylenically unsaturated hydrocarbon chain of two to four carbon atoms which may be substituted by an alkyl or a hydroxy group or both an alkyl and a hydroxy group and in which, when the chain contains four carbon atoms, the carbon atom adjacent to the phenyl group may be substituted by an oxo group, Ar represents a phenyl group optionally substituted by one or two substituents selected from alkyl, haloalkyl (especially perhaloalkyl such as trifluoromethyl) dimethylsulphamoyl and cyano groups and halogen (preferably fluorine or chlorine) atoms, and T represents the residue of a triazole ring, one nitrogen atom of which may carry an acyl, alkyl or hydroxyalkyl substituent, and acid addition salts of such compounds.

It is to be understood that in this specification and appended claims all alkyl, haloalkyl, acyl and hydroxyalkyl groups contain a maximum of four carbon atoms.

The aforesaid compounds possess pharmacological and psychotropic properties which render them useful in human and veterinary medicine, having in particular a beneficial effect on abnormal psychomotor activity. Preferred compounds are those represented by general Formula I where Ar represents an unsubstituted phenyl group or an o-chlorophenyl, o-fluorophenyl or a m-trifluoromethylphenyl group and X represents a —CH$_2$—CH$_2$— group. Of particular interest are 5-[2'-(4-phenylpiperazin - 1 - yl)ethyl]benzo-1,2,3-triazole, 5-[2'-(4-o-chlorophenylpiperazin-1-yl)ethyl]-benzo-1,2,3,-triazole, 5-[2'-(4 - o - fluorophenylpiperazin-1-yl)ethyl]-benzo-1,2,3,-triazole, 5-[2'-(4-p-fluorophenylpiperazin-1-yl)ethyl]-benzo-1,2,3-triazole and 5-[2'-(4-m-trifluoromethylphenylpiperazin-1-yl)ethyl]-benzo-1,2,3-triazole, and their acid addition salts.

According to a featuring of this invention, the compounds of general Formula I are prepared by reacting a piperazine derivative of the general formula:

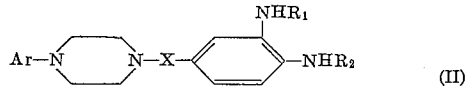
(II)

(wherein one of the groups R$_1$ and R$_2$ is a hydrogen atom and the other is a hydrogen atom or an acyl or an alkyl or hydroxyalkyl group, and Ar and X are as hereinbefore defined) with nitrous acid followed, if necessary when R$_1$ and R$_2$ both represent hydrogen atoms, by the introduction by known methods of an acyl, alkyl or hydroxyalkyl substituent on a nitrogen atom of the resulting triazole ring. Introduction of an acyl group into a product with no triazole ring substituent may be effected, for example, by reacting the product with an acid halide or anhydride; introduction of an alkyl substituent may be effected, for example, by first forming an N-acyl compound and reducing the acyl group to alkyl, e.g., by treatment with lithium aluminium hydride, or in the case of a methyl substituent by reaction with a methylating agent such as diazomethane. By the term "known methods" as used in this specification and accompanying claims is meant methods heretofore employed or described in the chemical literature.

Where the starting material of Formula II is one in which R$_1$ or R$_2$ is an acyl group, the resulting product which contains an N-acyl substituent may be deacylated by hydrolysis, e.g., with aqueous ammonia, to obtain a compound of general Formula I unsubstituted in the triazole ring.

The piperazine derivatives of Formula II employed as starting material in the aforesaid process may be obtained by the process described and claimed in the specification of co-pending application Serial No. 108,966, now abandoned.

When the benzotriazole derivatives of general Formula I are used for therapeutic purposes in the form of salts, it should be understood that only those such salts should in practice be employed as contain anions that are relatively innocuous to the animal organism when used in therapeutic doses, so that the beneficial physiological properties inherent in the parent compound are not vitiated by side-effects ascribable to those anions; in other words, only non-toxic salts are contemplated. Suitable acid addition salts include hydrohalides (for example hydrochlorides), phosphates, nitrates, sulphates, maleates, fumarates, citrates, tartrates, isethionates, methane sulphonates, and ethane disulphonates. These salts may be made from the bases of general Formula I by the methods heretofore used in the art for making acid addition salts. For example, the acid addition salts may be made by mixing the required base with an equivalent quantity of a non-toxic acid in a solvent and isolating the resultant salt by filtration after, if necessary, evaporation of part or all of the solvent. They may be purified by crystallisation or by any other method commonly used in the art.

The following examples illustrate the invention.

*Example I*

1 - [2' - (4-acetamido-3-aminophenyl)ethyl]-4-phenylpiperazine (3.4 g.) was suspended in water (30 ml.) and treated dropwise at 0–5° C. with a solution of hydrochloric acid ($d$=1.18; 2.5 ml.) in water (7.5 ml.), followed by a solution of sodium nitrite (0.75 g.) in water (10 ml.) each addition taking about twenty minutes. The resulting reaction mixture was stirred for a further twenty minutes at 5–8° C., and then poured into an excess of icecold 2 N aqueous ammonia solution. The yellow precipitate was collected, dried and recrystallised from a mixture of isopropanol and cyclohexane to give 5-[2'-(4-phenylpiperazin-1-yl)ethyl]-benzo-1,2,3-triazole (2.2 g.; 72%) as yellow microcrystalline plates, M.P. 173–175° C.

*Example II*

Proceeding as described in Example I but using 1-[2'-(4 - acetamido - 3 - aminophenyl)ethyl]-4-o-chlorophenylpiperazine as starting material, there was prepared 5-[2'-(4 - o - chlorophenylpiperazin-1-yl)ethyl]-benzo-1,2,3-triazole, M.P. 185–187° C.

*Example III*

Proceeding as described in Example I but using 1-[2'-(4 - acetamido - 3 - aminophenyl)ethyl]-4-p-chlorophenylpiperazine as starting material, there was prepared 5-[2'-4 - p - chlorophenylpiperazin-1-yl)ethyl]benzo-1,2,3-triazole, M.P. 152–155° C.

*Example IV*

Proceeding as described in Example I but using 1-[2'-(4 - acetamido-3-aminophenyl)ethyl]-4-m-trifluoromethylphenylpiperazine as starting material, there was prepared 5-[2'-(4-m-trifluoromethylphenylpiperazin-1-yl)ethyl]-benzo-1,2,3-triazole, M.P. 127–128° C.

*Example V*

Proceeding as described in Example I but using 1-[2'-(3-amino-4-N-ethylaminophenyl)ethyl]-4-o-chlorophenylpiperazine as starting material, there was prepared 5-[2'-(4-o-chlorophenylpiperazin-1-yl)ethyl]-1-ethyl-benzo-1,2,3-triazole, M.P. 105–107° C.

The present invention further includes within its scope pharmaceutical compositions which comprise one or more compounds of general Formula I, or non-toxic acid addition salts thereof together with a significant amount of a pharmaceutical carrier. The invention includes especially such compositions made up for oral or parenteral administration. In clinical practice the compounds of the present invention will normally be administered orally so that compositions suitable for oral administration are preferred.

Solid compositions for oral administration include compressed tablets, pills, dispersible powders, and granules. In such solid compositions one or more of the active substances is or are admixed with at least one inert diluent such as calcium carbonate, potato starch, alginic acid, or lactose. The compositions may also comprise, as is normal practice, additional substances other than inert-diluents, e.g., lubricating agents, such as magnesium stearate.

Liquid compositions for oral administration include pharmaceutically acceptable emulsions, solutions, suspensions, syrups, and elixirs containing inert diluents commonly used in the art, such as water and liquid paraffin. Besides inert diluents such compositions may also comprise adjuvants, such as wetting and suspending agents, and sweetening and flavouring agents.

The compositions according to the invention for oral administration also include capsules of absorbable material such as gelatin containing one or more of the active substances with or without the addition of diluents or excipients.

Preparations according to the invention for parenteral administration include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositions, which can be dissolved in sterile water or some other sterile injectable medium immediately before use.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should normally contain at least 0.025% by weight of active substance in the case of injectable solutions and at least 0.1% by weight of such substance in the case of oral preparations.

The following example illustrates pharmaceutical compositions according to the invention.

*Example VI*

Tablets of the formula:

| | Mg. |
|---|---|
| 5-[2'-(4-phenylpiperazin-1-yl)ethyl]-benzo-1,2,3-triazole | 10 |
| Lactose | 49.5 |
| Starch | 20 |
| Dextrin | 20 |
| Magnesium stearate | 0.5 | are prepared by intimately mixing the benzotriazole derivative, lactose, starch and dextrin and passing the mixture through a 60-mesh British Standard sieve. After addition of the magnesium stearate, the mixture is granulated to a suitable size and the granules compressed to form tablets.

We claim:

1. A compound selected from the group consisting of benzotriazole derivatives of the formula:

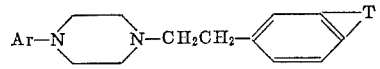

wherein Ar represents a member of the class consisting of phenyl, halophenyl and trifluoromethylphenyl and T represents a member of the class consisting of the residue of a triazole ring and such a ring N-substituted by alkyl of up to four carbon atoms, and their acid addition salts having pharmaceutically acceptable anions.

2. 5-[2'-(4-phenylpiperazin-1-yl)ethyl]-benzo-1,2,3-triazole.

3. 5-[2'-(4-o-chlorophenylpiperazin-1-yl)ethyl]-benzo-1,2,3-triazole.

4. 5-[2'-(4-o-fluorophenylpiperazin-1-yl)ethyl]-benzo-1,2,3-triazole.

5. 5-[2'-(4-p-fluorophenylpiperazin-1-yl)ethyl]benzo-1,2,3-triazole.

6. 5-[2'-(4-m-trifluoromethylphenylpiperazin-1-yl)ethyl]-benzo-1,2,3-triazole.

References Cited in the file of this patent

UNITED STATES PATENTS

| 2,861,078 | Miller et al. | Nov. 18, 1958 |
| 2,927,924 | Mills | Mar. 8, 1960 |